(12) United States Patent
Kaplan

(10) Patent No.: US 7,991,728 B2
(45) Date of Patent: Aug. 2, 2011

(54) COMPUTER REPUTATION-BASED MESSAGE BOARDS AND FORUMS

(75) Inventor: Craig A. Kaplan, Aptos, CA (US)

(73) Assignee: PredictWallStreet, Inc., Capitola, CA (US)

(*) Notice: Subject to any disclaimer, the term of this patent is extended or adjusted under 35 U.S.C. 154(b) by 0 days.

(21) Appl. No.: 12/898,619

(22) Filed: Oct. 5, 2010

(65) Prior Publication Data

US 2011/0047119 A1 Feb. 24, 2011

Related U.S. Application Data

(63) Continuation of application No. 11/541,436, filed on Sep. 29, 2006, now abandoned.

(60) Provisional application No. 60/722,101, filed on Sep. 30, 2005.

(51) Int. Cl.
*G06F 17/00* (2006.01)
*G06N 5/02* (2006.01)

(52) U.S. Cl. .......................................... 706/50

(58) Field of Classification Search .................. 706/45
See application file for complete search history.

(56) References Cited

U.S. PATENT DOCUMENTS 7,451,213 B2 * 11/2008 Kaplan ........................ 709/224
7,653,726 B2 * 1/2010 Kaplan ........................ 709/224

OTHER PUBLICATIONS

Decision tree based duration prediction in Mandarin, Qing Quo; Katae, N.; Natural Language Processing and Knowledge Engineering, 2005. IEEE NLP-KE '05. Proceedings of 2005 IEEE International Conference on Digital Object Identifier: 10.1109/NLPKE.2005.1598736 Publication Year: 2005, pp. 209-212.*

A hybrid approach to text compression, Gutmann, P.C.; Bell, T.C.; Data Compression Conference, 1994. DCC '94. Proceedings Digital Object Identifier: 10.1109/DCC.1994.305930 Publication Year: 1994, pp. 225-233.*

The Google Similarity Distance, Cilibrasi, R.L.; Vitanyi, P.M.B.; Knowledge and Data Engineering, IEEE Transactions on vol. 19, Issue: 3 Digital Object Identifier: 10.1109/TKDE.2007.48 Publication Year: 2007, pp. 370-383.*

* cited by examiner

*Primary Examiner* — Michael Holmes
(74) *Attorney, Agent, or Firm* — Perkins Coie LLP

(57) ABSTRACT

System and method for operating reputation-based communication or content service. Method includes obtaining metric related to first user contributor reputation; identifying communication or content having association with first user contributor; and processing communication or content to generate processed communication or content based on the obtained objective contributor reputation. Service is broadly defined and may be selected from bulletin board, message board, chat room, forum, information provision service, content delivery service, email service, information provision service, search engine service, content delivery service, communication or content screening service, communication or content screening service, or other. System for providing reputation processed based on-line communication or content. Communication or content provided or generated by the inventive system or method. Business method for operating a communications or content provision service. Computer program and computer program product stored either on a tangible media or in an electronically accessible and readable form to implement method.

55 Claims, 5 Drawing Sheets

| | Comment /301 | Forecast For /302 | Past Accuracy /303 |
|---|---|---|---|
| 304<br>305 | ckaplan said: "I think Merrill Lynch will go up because they just announced a new index."<br>[Friday, September 30, 2005 3:50:00 AM ET] | Up from 61.31 /321 | 80% correct /322 |
| 306<br>308 | huggybear32 said: "UP, UP, and away... these guys are on a tear. Look at the chart!"<br>[Friday, September 30, 2005 3:55:00 AM ET] | Up from 61.37 /323 | 64% correct /324 |
| 309<br>310 | StockWiz said: "down on profit-taking"<br>[Friday, September 30, 2005 3:55:05 AM ET] | DOWN from 61.37 /325 | 52% correct /326 |
| 312<br>314 | mturner said: "Just guessing, but down."<br>[Friday, September 30, 2005 3:47:00 AM ET] | DOWN from 61.30 /327 | 50% correct /328 |

*FIG. 3*

COMPUTER REPUTATION-BASED MESSAGE BOARDS AND FORUMS

CROSS-REFERENCE TO RELATED APPLICATIONS

This Continuation patent application claims priority to U.S. patent application Ser. No. 11/541,436, filed 29 Sep. 2006, entitled Contributor Reputation Based Message Board and Forums, which claims the benefit of priority to U.S. Provisional Patent Application Ser. No. 60/722,101 filed 30 Sep. 2005, entitled Reputation-Based Boards, which applications are hereby incorporated by reference.

This application also claims priority to U.S. application Ser. No. 11/526,218, filed 22 Sep. 2006 entitled Graphical Forecasting Interface, by Craig A. Kaplan and Calen Lopata, and PCT/US06/36922, filed on 22 Sep. 2006, entitled Graphical Forecasting Interface by Craig A. Kaplan and Calen Lopata, which applications are hereby incorporated by reference.

FIELD OF THE INVENTION

This invention pertains generally to Internet, web, and network-based message boards and forums, chat rooms, email, and other forms of asynchronous and synchronous communication and more particularly to such message boards and forums, chat rooms, email and the like for which a contributor or poster reputation is automatically evaluated on some objective criteria and used to rank, rate, or filter contributions, postings, or other content contributed by or attributed to the contributor or poster.

BACKGROUND

Currently, many message boards and forums exist online. For example, Raging Bull is a popular message board where investors can post their thoughts about the prospects of various stocks. SlashDot.org is a forum where members can post their thoughts about technology issues, and rate the posts of others. Particularly useful is SlashDot's capability of filtering, or ordering, posts based on how other readers subjectively scored or liked the posts. Unfortunately, the method of collaborative filtering employed by Slashdot, and by many other sites, relies on subjective judgment, after the fact. That is, readers spend time reading a post and then some of them offer subjective judgments as to quality or how much they liked or disliked the post.

Although somewhat useful, there are inherent inefficiencies and deficiencies in these conventional methods. First, many people will read a posting but not everyone rates the posting. This means that a few people with strong opinions (and possibly a single or a few people with multiple user identities or IDs) can bias the system by rating early and often. Second, many people still have to search and/or wade through poor quality information that has limited or no quality ratings while waiting for the information to be scored by others. Third, the "quality" of a post is very subjective. In general, what one person may think of as being useful, another person may classify or rate as useless or junk. Most sites do not have rigorous criteria for making objective quality ratings or even subjective quality ratings. Even if these rigorous criteria were added, such criteria would be time consuming to learn and apply and would likely reduce user participation. Any enforcement of the criteria would also be difficult or impossible to implement in practical terms. Thus, the current state-of-the-art is a relatively crude filtering capability that is subjective at best, that can be applied only after a post or submission has been written, and that works (if at all) by shifting the burden of quality control to the users of a web site or other interactive or on-line forum.

No known on-line sites, message boards, plural user contributed or other forums or the like are known that use or have a capability of filtering posts or contributions, in advance, based on the reputation of the poster or contributor especially of sites, message boards, and/or forums where there are a plurality of posters or contributors other than for example a site, message board, or forum administrator or originator.

A major difficulty in constructing such a system to date has been the challenge of obtaining reliable and objective information on the quality of posters or contributors. As mentioned above, a site like SlashDot necessarily relies on the subjective judgment of their readers to assign scores. Other sites that have quality rating systems (e.g., the on-line auction site Ebay) also typically rely on subjective user ratings. When raters know that they too will be rated (as for example on Ebay) the "reputations" become even less reliable since people are reluctant to give poor ratings for fear they will receive negative ratings in retaliation. Furthermore, since many posters are one-time posters or infrequent posters, it is often impossible to reliably predict even the subjective quality of posts in advance. There simply aren't enough data points to create a reliable trend in most cases.

Briefly then, conventional systems and methods in use today in the Internet and on-line posting domain is the filtering of posts based on subjective quality ratings of the posts, and no apparent attempt to filter posts based on an objective quality metric of the poster. In the user reputation domain, we see Ebay-like subjective commentaries or evaluations (not objective reputations) that are usually inflated and not very useful (and not reliable in any event) until many data points (e.g., many transactions) have been established.

SUMMARY OF THE INVENTION

In one aspect, the invention provides a method for operating a reputation-based communication or content service including the steps of obtaining at least one metric related to a first user contributor reputation; identifying a communication or content having an association with the first user contributor; and processing the communication or content to generate a processed communication or content based on the obtained objective contributor reputation.

In another aspect the method is provided in a service is selected from the set of services consisting of an online bulletin board, an online message board, a chat room, a forum, a information provision service, a content delivery service, an email service, an information provision service, a search engine service, a content delivery service, a communication or content screening service, a communication or content screening service, and any combination of these.

In another aspect, the invention provides a system for providing a reputation processed based on-line communication or content, the system comprising: a contributor reputation metric collection component; a communication or content medium identification component; and a communication or content reputation processing component.

In one aspect, the invention provides a communication or content provided or generated by the inventive system or method.

In another aspect, the invention provides a business method and business model for operating a communications or content provision service.

In another aspect the invention provides a computer program and computer program product stored either on a tangible media or in an electronically accessible and readable form.

BRIEF DESCRIPTION OF THE DRAWINGS

FIG. 1 is an illustration showing an exemplary embodiment of a system for providing and using the inventive reputation-based message board, web site, forum, chat room, other communications or content based or related site or service, or the like.

FIG. 3 is an illustration showing an embodiment of a simple reputation-based bulletin board (RBB) as if might appear if posts were sorted by reputation for accuracy.

DETAILED DESCRIPTION OF EMBODIMENTS OF THE INVENTION

Figure 1:
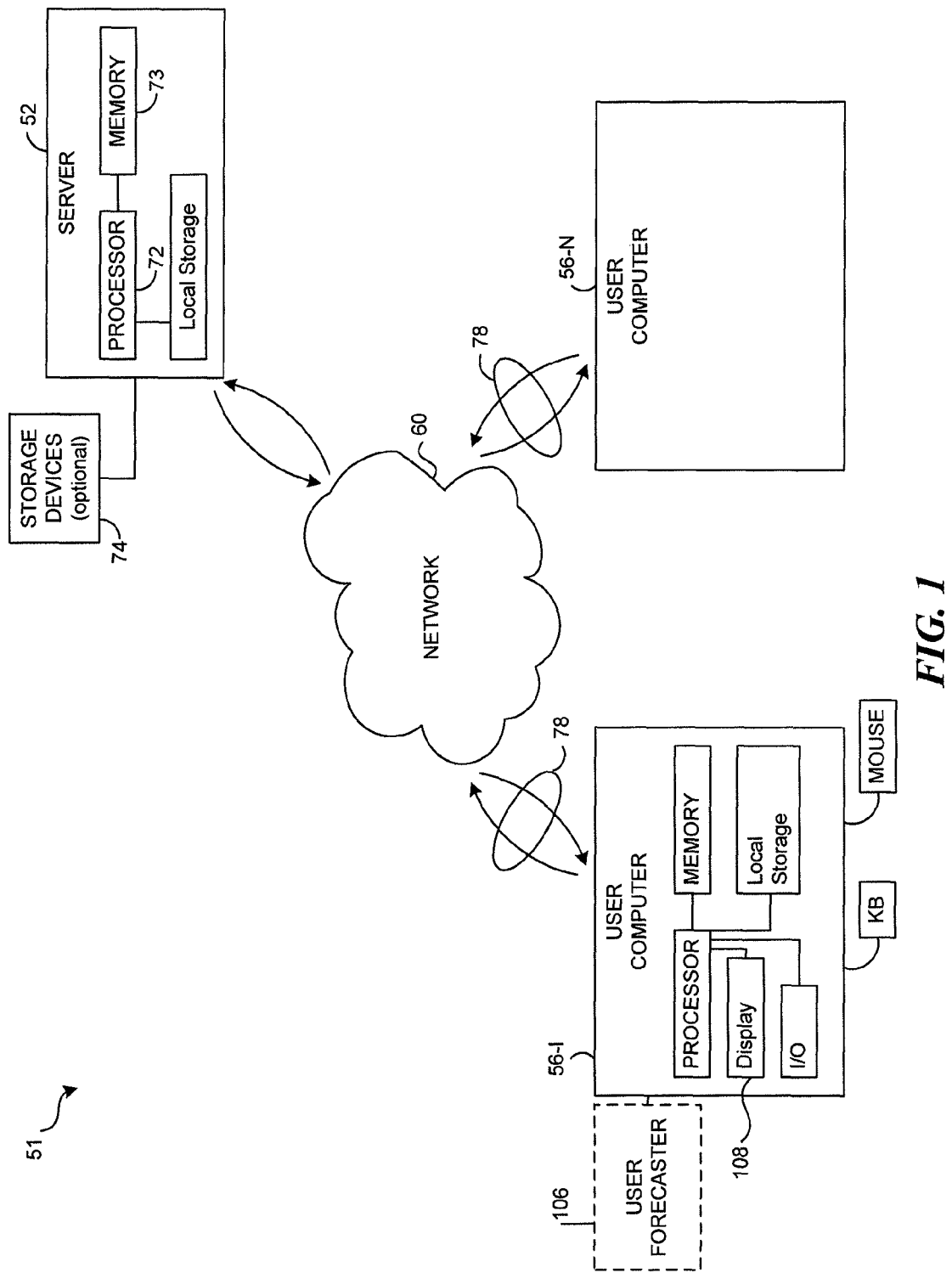

The current invention is provides system, device, method, computer program, and business method for filtering posts based on objective quality metrics (e.g., the objective performance track record or reputation) of the poster. This performance track record or reputation may be based on historical past performance. The invention is referred to as Reputation-Based Boards (RBB) at least in part because it is the reputation (e.g. objective performance track record) of the poster that drives filtering (typically) of posts on message boards. The objective performance track record may for example be an objective performance accuracy track record or history.

RBB is not limited only to message boards, web sites, or forums and the inventive RBB system and methodology which refer to each of these and others can add significant value to any type of bulletin board, message board, or other form of online information exchange where the information source or component of the information source can be identified or "tagged" with a poster reputation. The more objective and quantifiable the reputation can be, the better. By way of example but not of limitation, a licensed medical surgeon posting on an online forum about a surgery may have an online reputation that reflects the number (and/or percentage) of successful surgeries completed or years of surgical practice or some other factual objective measure; and, a stock forecaster might have an online reputation that reflects the percentage of correct stock predictions or some other objective measure of the posters stock forecasting prediction performance.

By collecting objective metrics automatically and matching these reputation metrics closely to the topic of the message board, it is possible to filter posts with much greater objective accuracy, and with much less human effort, than existing conventional collaborative filtering schemes (such as for example Slashdot) or reputation-rating schemes (such as for example Ebay). By way of example but not limitation, it may be understood that the www.PredictWallStreet.com website (developed and operated by the inventor of the present invention) automatically tracks the accuracy of individuals who predict stock prices online. Accuracy is tracked for every prediction allowing the site to assign very specific, 100% objective, reputations to predictors.

In one exemplary embodiment of determining, associating, or assigning reputations, the reputation associated with a particular poster or contributor may be very closely tied to the posting or contribution made, even within a particular field. Consider use Joe, an online stock forecaster, who may have correctly predicted the movement of IBM stock 80% of the time, but only correctly predicted the movement of Wal-Mart stock 50% of the time. This past objective performance seems to suggest that Joe has more insight or understanding into IBM stock (or perhaps the stock market segment in which IBM stock belongs) than to Wal-Mart (or perhaps it's market segment). Therefore, when Joe posts messages about IBM (on the IBM stock message board) he would have a strong reputation due to his relatively accurate track record of correct predictions. On the Wal-Mart stock message board, his reputation would be relatively poor. Reputations may be subjected to aging or other refinement so that recent objective history is given a greater objective weight, or stated differently, older performance may be discounted or not considered at all. In addition reputations may be transformed or processed by any one or combination of a variety of different types of deterministic or statistically based algorithms and statistical formulas or computations, if such transformations or processing proves to yield more useful reputations or reputation based results.

Note that nobody needs to read and score Joe's posts or contributions (in this case stock forecasts) in an attempt to subjectively determine their quality. Instead, the posts may be automatically filtered based on Joe's objective reputation—a reputation that can be specific to each message board, on-line forum, or other source. For example, another user Steve may go to the message board and request to see only posts by people who have had an 80% or better track record. On the IBM board, Steve will see Joe's posts since Joe's contribution meets or exceeds the performance criteria of 80%. On the Wal-Mart board, Joe's posts won't appear because his track record (50%) is below the threshold set by Steve. Of course, rather than setting a threshold, Steve might just ask to see the posts ranked by the most accurate predictions first, or filtered in other ways. Criteria need not be numeric either and may be set into performance categories such as very reliable, usually reliable, questionable, erratic, or any other category that may be established to represent the objective past performance of the poster or contributor. The point is that Steve can make a much more informed decision about what to do with the information in Joe's post because Steve knows that Joe's reputation is based on objective performance criteria. Further, all readers are saved the chore of rating others. The system collects the reputation metrics automatically.

Many variations of the RBB invention are possible and it can be applied to a wide range of domains. Two main sources of added value (among others) are: (1) that objective metrics are collected automatically, and (2) the ability to filter or automatically select posts to see based on these metrics.

One of the advantages of a RBB is that it establishes a reputation, even if the poster has made no previous posts. With PredictWallStreet.com, for example, a predictor who has done consistently well over many predictions will have a good reputation starting with his or her very first post. When RBB is, combined with means of acquiring many objective performance metrics points easily and quickly (as explained in greater detail in the paragraphs to follow), it becomes especially powerful and valuable.

Attention is now directed to a particular exemplary embodiment of the invention that includes three primary components: (1) a metric collection component, (2) a communication medium component or system such as a message board component or system which in a non-limiting embodiment includes (a) means and method for entering information, and (b) means and method for displaying information; and (3) a filtering mechanism and method which allows the message board to sort or otherwise modify the display of information that has been entered, based on the metrics (such as poster reputation) that have been collected. Other embodiments of the invention may separately include the individual components with the others being optional.

We first describe a system on which embodiments of the invention may be practiced. It will be appreciated that as embodiments of the invention may be implemented on virtually any computer system having a first node or machine for hosting the web site, message board, forum or other posting entity, and that the poster of contributor may be on any other (or even the same server or other host machine) computer machine or information appliance, the invention is applicable to almost an unlimited variety of machine types and/or architectures and the exemplary embodiment is merely illustrative and not limiting.

FIG. 1 shows an exemplary embodiment of a system 51, incorporating a server 52 that may serve to interact with one or more users 54 over an interactive electronic medium such as computers 56 or other information appliances coupled to the server 52 over a network 60 such as the Internet. Network, server, and computer and communications links that are conventional in nature and not shown in the figure to avoid obscuring aspects of the invention.

The server 52 may include one or more processors 72 and processor coupled or associated memory 73 for any processing tasks that may be required. Such processing tasks may include controlling communications over the network to and from users, accessing one or more integrated or separate storage devices 74 such as for example hard disk drive persistent mass storage devices that may store programs, data, and other system, contributor, reputations, and/or other data and/or information described herein. Processing may also include activities of activities in support of processing user contributed information or information relative to rankings, ratings, reputations of the like as described herein elsewhere.

A user may access the server from a client side computer or information appliance (machine) 77 over the network communication link or line 78. The user may be provided with a computer program code or applet to display and interface with the server. Local storage may be provided on the local user computer or information appliance for storing data, tokens, cookies, or other identifiers or information.

Although a single server is illustrated, the functions and operations performed by the server may be distributed over a plurality of servers either for the purpose of scalability, redundancy, performance or for other reasons.

Attention is now directed to a description of one particular embodiment of the inventive system and method, which includes three main components: (1) a metric collection component; (2) a site, message board, and/or forum component which advantageously may include means and method for enter information and optionally but advantageously means and method for displaying information; and, (3) a rating, ranking, and/or filtering component which advantageously provides a mechanism which allows the site, message board, forum or the like to sort or otherwise modify the display of information that has been entered, based on the metrics (one metric being reputation) that have been collected.

Figure 2:
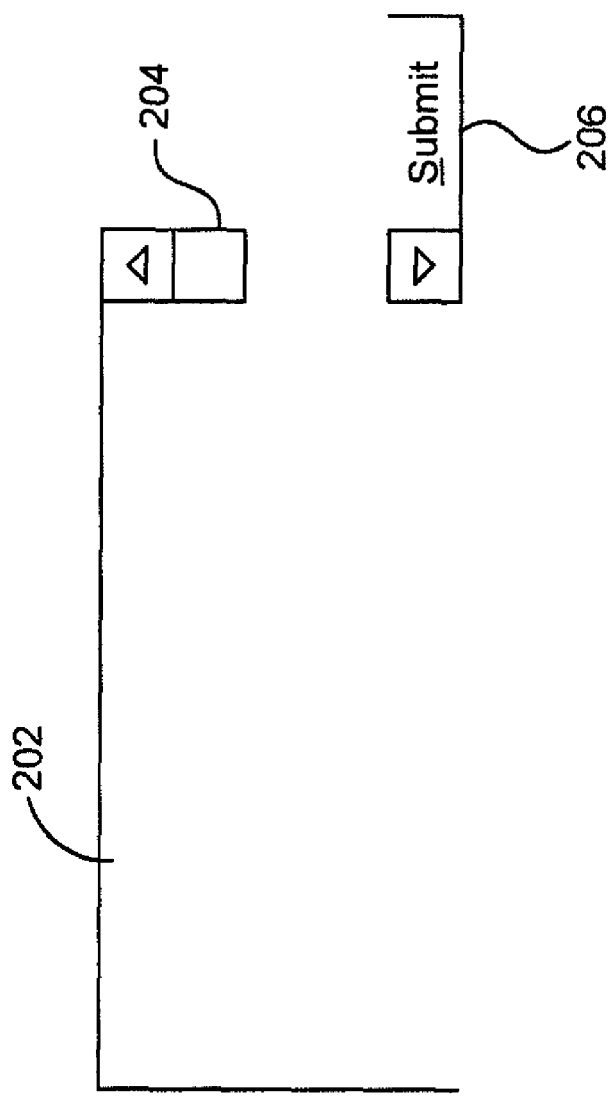
FIG. 2 is an illustration showing an embodiment of a simple input box for a message board or comment entry from a pre-release mock-up of a predictwallstreet.com web site.

Embodiments of means for entering information or comments are later described relative to FIG. 2 and embodiments for displaying information or comments are later described relative to FIG. 3. It may be appreciated that the means and method for collecting metrics, for entering information, and for displaying information may occur only on the user or client computer or information appliance, only on a server computer, or distributed between the two in some manner so that none of these three main components may be required on any one computing machine. It may also be appreciated that certain of the components may be optional to a server component, or to a client component.

Each of these main components are now described in greater detail including a description of several non-limiting embodiments, and with additional descriptions of variations, optional features and elements, and preferred implementations and/or embodiments.

First, with regard to the metric collection system, automated data collection where data is collected without requiring additional input from a user or contributor, is preferable to requiring users to input data. The contributor or poster objective or factually based reputation is one such metric. When it is desired to collecting data automatically, systems and methods that can collect lots of relevant data points quickly and with minimal user effort are advantageously utilized. In cases where it is not critical that the reputation metrics be recent, use of pre-existing data may sometimes be possible and may be implemented for some non-limiting embodiments of the invention. Generally, however, for systems with large numbers of users for whom metrics have not already been collected, this "analyze the pre-existing data" approach is not feasible. Usually collecting, updating, or otherwise having and using current metrics is advantageous, so that other embodiments may use this approach.

Specifically, in the case of financial forecasting systems, accuracy of predictions is a key performance metric. Accuracy can be measured as directional accuracy (for example, how often did the stock go up when the contributing predictor predicted it would go up) or absolute accuracy (for example, how close was the contributing predictor's predicted price target to the actual price the stock achieved). Although there is some data on predictions of some professional analysts, the data is often incomplete and generally not as fined-grained as one would desire. Therefore, use of pre-existing objective data may not be the preferred implementation for a financial forecasting RBB in many cases, though certain embodiments of the invention may use such pre-existing objective data either alone or in addition to other data. However, in specialized cases (for example serving users who only care about the posts of established analysts) it could represent the, or one of several, preferred implementations.

RBBs are particularly powerful and valuable to financial forecasting systems when many predictions can be gathered quickly and easily and the accuracy of these predictions calculated automatically. The Graphical Forecasting Interface (GFI) described in referenced related co-pending U.S. patent application Ser. No. 11/526,218, filed 22 Sep. 2006 entitled Graphical Forecasting Interface, by inventors Craig A. Kaplan and Calen Lopata, and PCT/US06/036922, also filed on 22 Sep. 2006 entitled Graphical Forecasting Interface by inventors Craig A. Kaplan and Calen Lopata, which applications are hereby incorporated by reference, is a method of collecting many data points from users very quickly and easily that may optionally be utilized with aspects of the Reputation-Based Boards (RBBs) of the instant application.

With the aforereferenced GFI or other graphical interface, thousands of predictions can be stored in a database with a minimal drain on a user's time. As time passes, the predictions are automatically checked against the current state of whatever is being predicted (e.g., stock price) and accuracy is automatically computed. Thus, based on minimal user effort, a detailed, objective track record can be automatically generated for each predictor. RBB then uses this track record to filter posts. A RBB and a graphical interface (such as for example the referenced patent-pending GFI graphical forecasting interface or another graphical interface) may operate synergistically when provided together. Therefore it may be appreciated that one preferred implementation and embodiment for forecasting systems may include both a graphical forecasting interface component and a reputation based board component.

Second, with regard to entering posts, comments, recommendations, forecasts, predictions, and/or other information or data, many options are possible ranging from simple text input boxes (illustrated in FIG. 2) to sophisticated multi-threaded bulletin board systems which are available as stand-alone products. Exemplary computer code is presented in Table 1 by way of example, as a way that a user may post comments or other information. Table 2 provides by way of example, computer code that may be used to display and view posted or contributed comments or other information. The code in Table 3 is exemplary computer program code for use within a web page to permit users to post and view comments and operates in conjunction with the code listed in Tables 1 and 2. This exemplary code provides a non-limiting illustration of how a simple message board from a financial forecasting system might work that uses past contributor accuracy as the objective reputation metric.

Chat rooms, email, and other forms of asynchronous and synchronous communication can also be used instead of, or in addition to, online bulletin or message boards, web sites, and forums. These aspects and applications of the invention benefit substantially for the third component, that of ranking, rating, and filtering. Various filtering mechanisms, means, and method are next described.

Consider that a chat room on a financial forecasting site might incorporates the ability to block communication (or some set of communication such as postings to a message board) from people who do not cross a minimum threshold for prediction accuracy. Similarly, a data feed consisting of forecasts that is streamed to a ticker (see the above referenced co-pending patent application), or to an RSS feed, would, in a preferred embodiment of the present invention, be filtered according to user preferences with regard to accuracy and/or other criteria that might be important to the user (e.g., which stocks are in my portfolio or watch list). These and other optional features may be provided by embodiments of the present invention.

In one embodiment, the reputation based board presents a compilation of relevant content based on the objective reputation of the contributors. The content may be any content such as a forecast or prediction, a recommendation, an opinion, a recommendation, a document, an image, a multimedia content, a comment or set of comments, an email or other communication, a message, a message board posting, a bulletin board posting, a forum posting, a personal profile, a dating profile, a connections posting, or any other item or content for which an objective reputation of a contributor, group of contributors, authors, reviewer(s), or the like may be useful for assessing the value of that content.

In one embodiment, the RBB processes the reputations of a group of contributors of a plurality of postings and uses the result of the processing to determine which contributor comments are included in the compilation. In one embodiment, an average, weighted average, or other algorithmic or statistical transformation, of the individual reputations may be presented along with the compiled postings.

It will be apparent in light of the description provided here, that the objective reputation of any single contributor may be used alone or in combination with the objective reputation of any other single or plurality of contributors, and, that once the objective contributor reputation information is available it may be applied to any content without limitation. The objective reputations may be used for many purposes beyond bulletin boards.

For example, in addition to other message board or content filtering described herein, content of any type may be filtered, compiled into collections of, highlighted in different colors or fonts or in different lists or different ways based on reputation metrics, automatically emailing or streaming comments that cross an identified reputation threshold, generating an alert in some fashion when content or material appears or is identified that has a strong enough reputation associated with it to be of interest to one or more users or groups of users, automatically deleting information or archiving information with sufficiently low reputation metrics, automatically linking to information based on the reputation associated with the information being linked to and/or the reputation associated with the information where the link originates, or other processing, cataloging, notifying, or the like based on the reputation metric.

In the context of a financial forecasting system and/or method, the ability to set accuracy thresholds (for example, a threshold set to show only predictors with greater than some specified XX % accuracy) and/or set to sort by accuracy are features that should be included in a preferred implementation.

Figure 4:
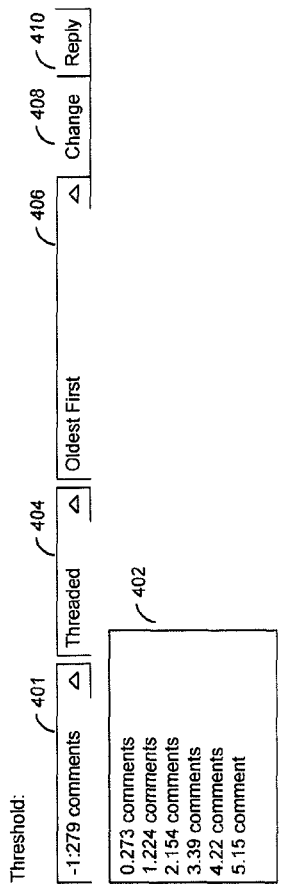
FIG. 4 is an illustration showing an Illustrative dropdown or pull-down filtering control.
Figure 4:
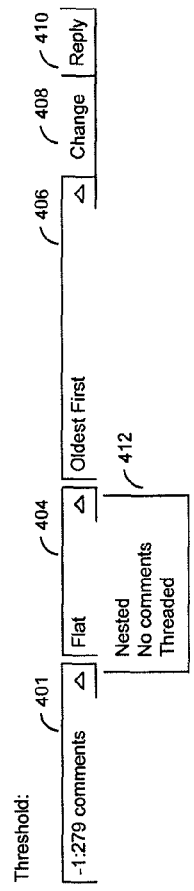
Figure 4:
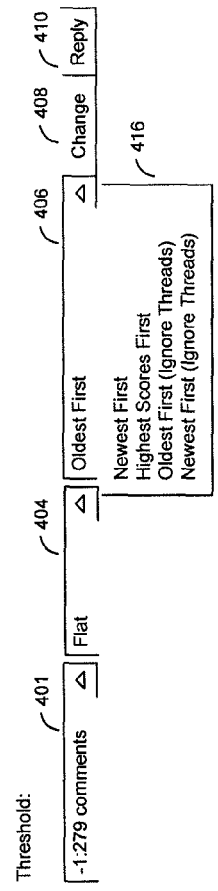
Figure 5:
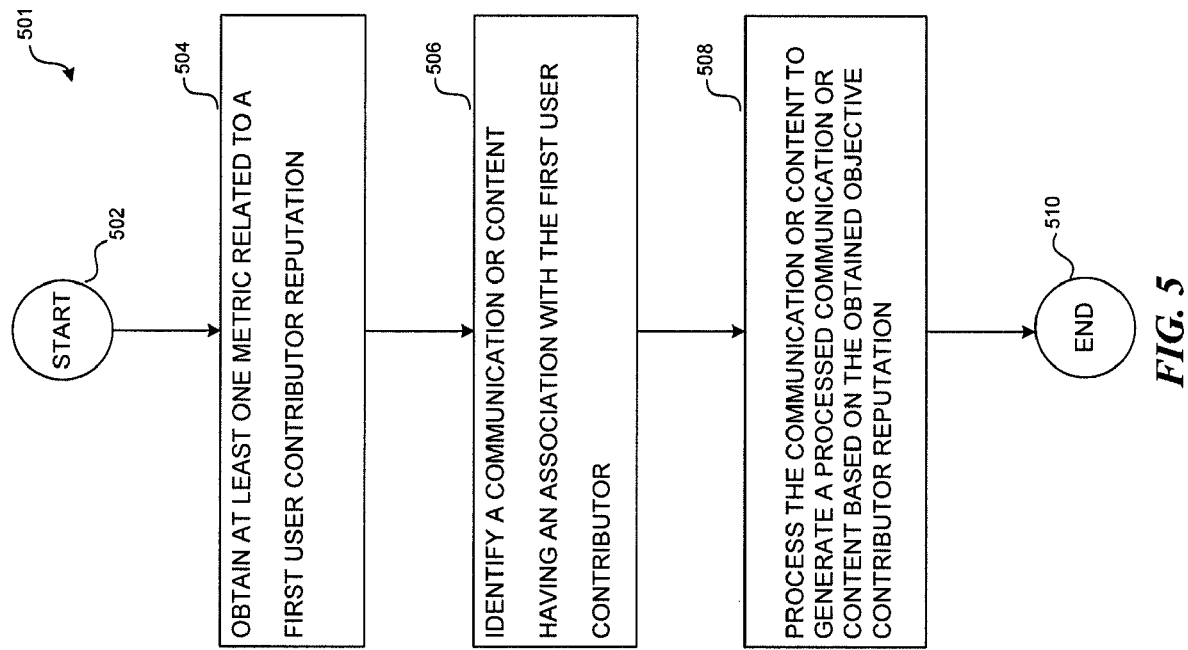
FIG. 5 is an illustration showing a flow-chart diagram of an embodiment of the inventive method.

FIG. 3 illustrates very simple sample output of sorting based on accuracy. The techniques for programming threshold, filtering, and sorting are well-known in the art, so we do not describe them in further detail. FIG. 4 (adapted from Slashdot.org) illustrates a commonly used user interface for filtering controls that could be part of a preferred implementation of RBB if criteria included objective poster reputations rather than subjective scores for posts. It is noted that the Slashdot.org criteria does not include either objective poster reputations or many other aspects of the invention set forth herein. The preferred implementation may also include, without limitation, the ability to sort/filter/threshold posts by date, by topic, by poster, and by other categories of interest including accuracy.

Having now described numerous aspects and embodiment of the invention including many optional features, attention is directed to the description of certain selected embodiments that include particular combinations of features.

In one embodiment (1) the invention provides a method for operating a reputation-based communication or content service, the method comprising: obtaining at least one metric related to a first user contributor reputation; identifying a communication or content having an association with the first user contributor; and processing the communication or content to generate a processed communication or content based on the obtained objective contributor reputation.

In another embodiment (2), the method may further including processing the communication or content along with other different communications or content from other different contributors based at least in part on the objective contributor reputation of one or of a plurality of contributors.

In another embodiment (3), the method may further require that the service is selected from the set of services consisting of an online bulletin board, an online message board, a chat room, a forum, a information provision service, a content delivery service, an email service, an information provision service, a search engine service, a content delivery service, a communication or content screening service, a communication or content screening service, and any combination of these.

In another embodiment (4), the method may further require that the obtaining at least one metric related to a first user contributor reputation comprises the step of collecting the at least one metric related to a first user contributor reputation.

In another embodiment (5), the method may further require that the method (4) require that the collecting the at least one metric related to a first user contributor reputation is performed automatically by the method without a separate conscious input by the user contributor.

In another embodiment (6), the method may further require that the obtaining at least one metric related to a first user contributor reputation comprises obtaining the at least one metric related to a first user contributor reputation from an external source.

In another embodiment (7), the method may further require that the identifying of the communication or content comprises: at least one of: (i) receiving a first communication or content from the first user contributor; and (ii) identifying a contribution or content attributed at least in part to the first user contributor.

In another embodiment (8), the method may further require that the identifying of a communication or content having an association with the first user contributor comprises In another embodiment (9), the method may further require sending a second communication to a user that includes the generated processed communication or content or portion thereof.

In another embodiment (10), the method may further require: obtaining at least one metric related to a plurality of different user contributor reputations; identifying a communication or content having an association with each of the plurality of user contributors; and processing the plurality of communications or contents to generate a processed communication or content based on the obtained objective contributor reputation for the plurality of different user contributors.

In another embodiment (11), the method may further require that the processing based on objective reputation comprises a processing selected from the set consisting of: filtering, sorting, ordering, screening, compiling, grouping, deleting, flagging, hiding, highlighting, promoting, and any combination of these based on objective reputation of a contributor or a plurality of contributors.

In another embodiment (12), the method (11) may further require that wherein the processing may be different for different contributors or for different groups of contributors.

In another embodiment (13), the method may further require that the processing based on objective reputation includes a processing selected from the set consisting of: filtering to include some items and not others based on objective reputation of the contributor or group of contributors, filtering based on objective reputation of the contributor or group of contributors, filtering to exclude some items and not others based on objective reputation of the contributor or group of contributors, compiling a set of relevant content based on objective reputation of the contributor or group of contributors, ordering based on objective reputation of the contributor or group of contributors, ordering from low to high based on objective reputation of the contributor or group of contributors, ordering from high to low based on objective reputation of the contributor or group of contributors, selecting or not selecting based on objective reputation of the contributor or group of contributors, processing based on objective reputation of the contributor or group of contributors, generating derivative objective reputation data based on objective reputation of the contributor or group of contributors, and any combination of these.

In another embodiment (14), the method may further require that the service is a communication forum selected from the set of forums consisting of a network site, an Intranet site, an Internet site, a world wide web site, an electronic mail or email, an interactive electronic bulletin board, an interactive electronic message board, an online information exchange, a set of email or comment threads, an online interactive stock prediction forum, an online forum, and any combination of these.

In another embodiment (15), the method may further require that the reputation metric comprises a factually based objective contributor reputation established in the same field of endeavor as the contribution being communicated.

In another embodiment (16), the method may further require that the objective contributor reputation comprises a historical accuracy-based reputation.

In another embodiment (17), the method may further require that the historical accuracy-based reputation is for a contribution in the same field as the reputation was established.

In another embodiment (18), the method may further require that the step of collecting objective metrics, comprises collective objective metrics automatically without compelling a user take separate actions to provide objective metrics of information from which objective metrics are derived.

In another embodiment (19), the method may further require matching these reputation metrics closely to the topic of the particular communication forum.

In another embodiment (20), the method may further require filtering contributor postings with a predetermined objective accuracy and without a conscious human input contribution relative to a filtering metric.

In another embodiment (21), the method may further require automatically tracking the accuracy of contributors who provide an online prediction or forecast of an element and generating a prediction accuracy result by comparing the prediction of the element with the actual value of the element at the predicted time and date, and automatically generating a prediction accuracy for the contributor based on that comparison.

In another embodiment (22), the method may further require that the element is an online stock price prediction.

In another embodiment (23), the method may further require that reputation metrics are be subjected to aging or other refinement so that recent objective history is given a greater objective weight or older performance may be discounted or not considered at all.

In another embodiment (24), the method may further require that collected or otherwise directly or indirectly available reputation metrics are processed to make them more useful.

In another embodiment (25), the method may further require that the processing to make them more useful comprises applying a statistical processing to a least one objective reputation metric.

In another embodiment (26), the method may further require that the applied statistical processing is selected from the set of statistical processing comprising: computing a weighted average over time, normalizing the reputation or plurality of reputations so that one contributor's reputation can be compared with another contributor's reputation according to some defined comparison criteria.

In another embodiment (27), the method may further require that the defined comparison criteria comprises an objective comparison criteria.

In another embodiment (27), the method may further require that the objective reputations comprise raw reputations, processed reputations, or any combination of raw reputations and processed reputations.

In another embodiment (28), the method may further require that the method further includes filtering or automatically selecting contributions to be seen or presented to a user based on an objective metric or combination of a plurality of metrics.

In another embodiment, the invention provides a system for providing a reputation processed based on-line communication or content, the system comprising: a contributor reputation metric collection component; a communication or content medium identification component; and a communication or content reputation processing component.

Various different embodiments of the system may incorporate components, functional blocks, computer program software, or other means for implementing the steps of the inventive method described herein.

In another embodiment (30), the system may further require that the collection component comprises a automatic collection component for collecting the reputation metric related to a contributor reputation automatically without a separate conscious input by a user contributor.

In another embodiment (31), the system (30) may further require that the at least one reputation metric is obtained from an external source.

In another embodiment (32), the system may further require that the contributor reputation metric identification component includes means for identifying of the communication or content selected from the set consisting of: (i) receiving a first communication or content from the first user contributor; and (ii) identifying a contribution or content attributed at least in part to the first user contributor.

In another embodiment (33), the system (32) may further require that the communication or content reputation processing component comprises a processing unit adapted for processing selected from the set of processing schemes consisting of filtering, sorting, ordering, screening, compiling, grouping, deleting, flagging, hiding, highlighting, promoting, and any combination of these based on objective reputation of a contributor or a plurality of contributors.

In another embodiment (34), the system (33) may further require that the processing may be different for different contributors or for different groups of contributors.

In another embodiment (35), the system (34) may further require that the communication or content reputation processing component comprises a processing unit adapted for processing selected from the set of processing schemes consisting of filtering, sorting, ordering, screening, compiling, grouping, deleting, flagging, hiding, highlighting, promoting, and any combination of these based on objective reputation of a contributor or a plurality of contributors.

In another embodiment (36), the system may further require that the communication or content medium component is selected from the set consisting of a network site, an Intranet site, an Internet site, a world wide web site, an electronic mail or email, an interactive electronic bulletin board, an interactive electronic message board, an online information exchange, a set of email or comment threads, an online interactive stock prediction forum, an online forum, and any combination of these.

In another embodiment (37), the system may further require that the communication or content medium component further includes (a) means and for entering information, and (b) means for displaying information.

In another embodiment (38), the system may further require that the communication or content filtering component provides means for sorting, limiting, compiling, or otherwise modifying {otherwise modifying is good, otherwise it sounds like only limiting and filtering and we are missing other forms of processing like compiling} the display of information that has been entered based on metrics that have been collected.

In another aspect, the invention provides a communication or content processed according to the method and or by a system as described.

In another aspect, the invention provides a computer program product stored in an electronically accessible media for altering the operation of a computer system or computer network, the computer program product including executable computer program instructions for causing the computer to generate a processed reputation-based communication or content and comprising instructions for: obtaining at least one metric related to a first user contributor reputation; identifying a communication or content having an association with the first user contributor; and processing the communication or content to generate a processed communication or content based on the obtained objective contributor reputation.

In another embodiment, the computer program and computer program product may provide program components to implement any of the steps and/or features of the described inventive method, and be implemented on a computer or on a plurality of computers to achieve a technical effect by altering the otherwise conventional operation of the computer or plurality of computers.

In another aspect, the invention provides a business method for operating a reputation-based communication or content provision service, the business method comprising: obtaining at least one metric related to a first user contributor reputation; identifying a communication or content having an association with the first user contributor; processing the communication or content to generate a processed communication or content based on the obtained objective contributor reputation; providing the processed communication or content to a subscriber; and receiving a remuneration from the subscriber in exchange for the provided processed communication or content.

In another embodiment, the business method may further require that the remuneration is a financial remuneration, a service remuneration, a commission remuneration, a referral remuneration, or any combination of these.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever

TABLE 1

Exemplary Code for User Comment
(File Name: comment.asp)

```
<%
Option Explicit
%>
<!--#include virtual="/asp/SystemFunctions.asp"-->
<!--#include virtual="/asp/FinWinFunctions.asp"-->
<!--#include virtual="/asp/DateTimeFunctions.asp"-->
<%
' Copyright 2005 iQ Company
Dim Global_Database_Connection
Set Global_Database_Connection = Server.CreateObject("ADODB.connection")
Global_Database_Connection.Open Application("DSN")
' This wasn't working ?!?!?
'SafeDate(Request("ForecastDate")), _
SaveForecastComment _
      Global_Database_Connection, _
      Session("RegisteredUserID"), _
      CData(Session("Login"), "string"), _
      Cdata(Request("StarRating"), "string"), _
      Cdata(Request("Symbol"), "string"), _
      NextForecastDate( ), _
      Cdata(Request("BaselinePrice"), "double"), _
      Cdata(Request("DirectionalForecastUp"), "string"), _
      Cdata(Request("Comment"), "string")
Global_Database_Connection.Close
Set Global_Database_Connection = Nothing
If Request("action") = "ajax" Then
      Response.Write "comment_area|Thank you, your comment has been saved."
      Response.end
End If
StartHTML "Comment Saved", "", "", ""
%>
<p>
<br>
<p align=center><font size=+1>Comment saved - thank you for contributing!
<br><br><a href="<%=Trim(Request("ReturnPage"))%>">Back</a></font></p>
<%
EndHTML
Sub SaveForecastComment(objConn, UserID, UserName, StarRating, Symbol, _
      MyForecastDate, BaselinePrice, DirectionalForecastUp, Comment)
      Dim ForecastDate, SQL
      ForecastDate = "'" & Replace(MyForecastDate,"'", "\'") & "'"
      SQL = "If Not Exists(Select Top 1 CommentID From tblDirectionalForecastComments Where
UserID = " & _
            UserID & " And ForecastDate = " & ForecastDate & " And Symbol = " & Symbol & _
            ") Insert Into tblDirectionalForecastComments " & _
            "(UserID, UserName, StarRating, Symbol, ForecastDate, " & _
            " BaselinePrice, DirectionalForecastUp, CreateDate, Comment) Values (" & _
            UserID & ", " & UserName & ", " & StarRating & ", " & Symbol & ", " &
ForecastDate & ", " & _
            BaselinePrice & ", " & DirectionalForecastUp & ", GETDATE( ), " & Comment & _
            ") ELSE Update tblDirectionalForecastComments Set Comment = " & _
            Comment & ", BaselinePrice = " & BaselinePrice & _
            ", DirectionalForecastUp = " & DirectionalForecastUp & ", StarRating = " & StarRating
& " WHERE UserID = " & _
            UserID & " And ForecastDate = " & ForecastDate & " And Symbol = " & Symbol
      objConn.Execute SQL
End Sub
%>
```

TABLE 2

Exemplary Code for Viewing User Comments
(File Name: Comment_view.asp)

```
<%
Option Explicit
%>
<!--#include virtual="/asp/SystemFunctions.asp"-->
<!--#include virtual="/asp/DisplayFunctions.asp"-->
<!--#include virtual="/asp/FinWinFunctions.asp"-->
<%
' Copyright 2005 iQ Company
Dim Symbol, ForecastDate
Dim Global_Database_Connection
```

TABLE 2-continued

Exemplary Code for Viewing User Comments
(File Name: Comment_view.asp)

```
Set Global_Database_Connection = Server.CreateObject("ADODB.connection")
Global_Database_Connection.Open Application("DSN")
Symbol = GetSymbolListFromInputList(Request("Symbol"))
ForecastDate = Request("ForecastDate")
StartHTML "Comments on " & Symbol, "", "", ""
'PrintHeader
DisplayAllComments Global_Database_Connection, Symbol, ForecastDate
'PrintFooter
EndHTML
Function DisplayAllComments(objConn, Symbol, ForecastDate)
    Dim rst, ForecastWeekday, NumStars, AccuracyHTML
    ForecastWeekday = DisplayWeekday(ForecastDate)
    Set rst = objConn.Execute("Select tblDirectionalForecastComments.*, " & _
                " Case When DirectionalForecastUp Is NULL Then 'No Opinion' " & _
                " When DirectionalForecastUp = 1 Then 'UP' " & _
                " Else 'DOWN' End " & _
                "as DirectionalForecastText From tblDirectionalForecastComments Where Symbol =
'" & _
                Symbol & "' And ForecastDate = '" & ForecastDate & "' Order By StarRating Desc")
    If Not rst.EOF Then
%>
    <p>
    <table border=0 cellpadding=0 cellspacing=5>
<%
                If Session("RegisteredUserID") = "" Then
                    %>
                    <tr><td colspan=3><font size=-1>Everyone can view comments, but to post
your own comments please <a href="javascript:window.close( );">close this window</a> and log
in.<br></font></td></tr>
                    <%
                End If
%>
        <tr>
            <td><font size=-1><b>Comment</b></font></td>
            <td><font size=-1><b>Forecast for <%=ForecastWeekday%></b></font></td>
            <td><font size=-1><b>Past Accuracy</b></font></td>
        </tr>
<%
    Do While Not rst.EOF
                NumStars = 1+rst("StarRating")
                If NumStars = 0 Then
                    AccuracyHTML = "Unrated"
                Else
                    AccuracyHTML = GetStarsHTML(5, 1+rst("StarRating"), False, "")
                End If
%>
        <tr>
            <td><font size=-1><%=Left(rst("UserName"), InStr(rst("UserName"), "@")-1)%> said,
"<%=rst("Comment")%>"</font>
                <br><font size=-2>[<%=FormatDateTime(rst("CreateDate"), vbLongDate) & " " &
FormatDateTime(rst("CreateDate"), vbLongTime)%> ET]</font></td>
            <td><font size=-1><%=rst("DirectionalForecastText")%> from
<%=DisplayDouble(rst("BaselinePrice"))%></font></td>
            <td><font size=-1><%=AccuracyHTML%></font></td>
        </tr>
<%
                rst.MoveNext
    Loop
%>
    </table></p>
<%
    Else
                Response.Write "<font size=+2>No comments for " & ForecastWeekday & "'s close
of " & Symbol & ".</font>"
    End If
End Function
%>
```

TABLE 3

Exemplary Code for use within a web page to permit users to post and view comments
(File Name: Comments Functionality.asp)

```
<%
' Copyright 2005 iQ Company
'ASP Code =======================================
================================================
' For use within a page where you want users to be able to post and view comments.
' Uses comment.asp and comment_view.asp
' Generates javascript for inclusion within HTML <head> tags.
Function GetCommentJavascript(Symbol, ForecastDate, BaselinePrice, DirectionalForecastUp,
StarRating)
    Dim QueryString
    QueryString = "Symbol=" & Server.URLEncode(Symbol) & _
        "&ForecastDate=" & Server.URLEncode(ForecastDate) & _
        "&BaselinePrice=" & Server.URLEncode(BaselinePrice) & _
        "&DirectionalForecastUp=" & Server.URLEncode(DirectionalForecastUp) & _
        "&StarRating=" & Server.URLEncode(StarRating) & _
        "&action=ajax"
    GetCommentJavascript = "<SCRIPT LANGUAGE=""JavaScript"">" & _
        vbCrLf & "<!--            " & _
        vbCrLf & "function URLencode(sStr) {" & _
        vbCrLf & "       return escape(sStr)." & _
        vbCrLf & "                    replace(/\+/g, '%2B')." & _
        vbCrLf & "                        replace(/\""/g,'%22')." & _
        vbCrLf & "                           replace(/\'/g, '%27')." & _
        vbCrLf & "                              replace(/\//g,'%2F');" & _
        vbCrLf & " }" & _
        vbCrLf & "function createRequestObject( ) {" & _
        vbCrLf & "      var ro;" & _
        vbCrLf & "      var browser = navigator.appName;" & _
        vbCrLf & "      if(browser == ""Microsoft Internet Explorer""){" & _
        vbCrLf & "          ro = new ActiveXObject(""Microsoft.XMLHTTP"");" & _
        vbCrLf & "      }else{" & _
        vbCrLf & "          ro = new XMLHttpRequest( );" & _
        vbCrLf & "      }" & _
        vbCrLf & "      return ro;" & _
        vbCrLf & "}" & _
        vbCrLf & ""& _
        vbCrLf & "var http = createRequestObject( );" & _
        vbCrLf & "" & _
        vbCrLf & "function sndReq(comment) {" & _
        vbCrLf & "       http.open('get', 'comment.asp?" & QueryString & QueryString &
"&comment='+URLencode(comment));" & _
        vbCrLf & "       http.onreadystatechange = handleResponse;" & _
        vbCrLf & "       http.send(null);" & _
        vbCrLf & "}" & _
        vbCrLf & "" & _
        vbCrLf & "function handleResponse( ) {" & _
        vbCrLf & "       if(http.readyState == 4){" & _
        vbCrLf & "          var response = http.responseText;" & _
        vbCrLf & "          var update = new Array( );" & _
        vbCrLf & "" & _
        vbCrLf & "          if(response.indexOf('|' != -1)) {" & _
        vbCrLf & "             update = response.split('|');" & _
        vbCrLf & "             document.getElementById(update[0]).innerHTML =
update[1];" & _
        vbCrLf & "          }" & _
        vbCrLf & "       }" & _
        vbCrLf & "}" & _
        vbCrLf & "//-->" & _
        vbCrLf & "</script>"
End Function
' Generates comment form
Function GetCommentArea(objConn, RegisteredUserID, Symbol, ForecastDate, BaselinePrice,
UserPrediction, StarRating)
    Dim MyHTML, rst, NumComments, CommentPlural
    Set rst = objConn.Execute("Select Count(*) as TheTotal From
tblDirectionalForecastComments where Symbol = '" Symbol & "' And ForecastDate = '" &
ForecastDate & "'")
    NuMComments = rst("TheTotal")
    Set rst = Nothing
    If RegisteredUserID <> "" Then
        MyHTML = GetDynamicCommentForm( SimulateThisPageLink( ), Symbol,
ForecastDate, BaselinePrice, UserForecast, ConvertDirectionalToBitForecast(UserPrediction),
StarRating )
    End If
    If NuMComments > 0 Then
        CommentPlural = ""
        If NumComments <> 1 Then
```

TABLE 3-continued

Exemplary Code for use within a web page to permit users to post and view comments
(File Name: Comments Functionality.asp)

```
            CommentPlural = "s"
        End If
        MyHTML = MyHTML & "<center><Font size=–1>" & _
            PopupWindowLink("View " & NumComments & " comment" &
CommentPlural & " on " & Symbol, _
                "/help/help.asp?text=" & Server.URLEncode("Comments on " &
Symbol) & "&src=" & Server.URLEncode("/comment_view.asp?Symbol=" &
Server.URLEncode(Symbol) & "&ForecastDate=" & Server.URLEncode(ForecastDate)), 500, 400) &
_
            "</font></center>"
    End If
    GetCommentArea = MyHTML
End Function
' Converts text forecast to bit forecast (for database storage)
Function ConvertDirectionalToBitForecast(UserPrediction)
    If UserPrediction = "UP" Then
        ConvertDirectionalToBitForecast = 1
    ElseIF UserPrediction = "DOWN" Then
        ConvertDirectionalToBitForecast = 0
    Else
        ConvertDirectionalToBitForecast = ""
    End If
End Function
%>
```

The invention claimed is:

1. A computer implemented method for operating a reputation-based communication or content service, the computer implemented method comprising:

obtaining at least one objective reputation metric related to a reputation of a first user contributor for making a prediction forecast as to a state or condition of a future event over a network comprising a plurality of interconnected computers including a first computer having a first processor and a first memory coupled to the first processor;

identifying a first communication or content having an association with the first user contributor; and processing the first communication or content in the first computer to generate a processed first communication or content based on the obtained at least one objective reputation metric; and wherein the obtaining of the at least one objective reputation metric is performed using prior inputs by the first user contributor through a graphical forecasting interface; and the processing further includes:

obtaining a plurality of prior predictions from the first user contributor for at least one particular predicted item state including obtaining at least some of the plurality of predictions using the graphical forecasting interface;

storing the obtained predictions in a database coupled with the network;

processing the stored predictions and automatically determining an objective prediction accuracy record from the stored first user contributed predictions by comparing the earlier predicted state with the later actual state of the same item corresponding to the prediction date and optionally to the prediction time; and using the detailed objective prediction record for the first user contributor to objectively filter contributor postings made by the contributor including in processing the first communication or content in the first computer to generate the processed first communication or content based on the obtained at least one objective reputation metric, the objective filtering being operative to filter sites, mess-sage boards, and/or bulletin board posts or contributions, in advance, based on the reputation of the user contributor.

2. A method as in claim 1, further including processing the first communication or content along with other different communications or content from other different contributors based at least in part on an objective reputation metric of one contributor or of a plurality of contributors.

3. A method as in claim 1, wherein the communication or content service is selected from a set of services consisting of an online bulletin board, an online message board, a chat room, a forum, a information provision service, a content delivery service, an email service, an information provision service, a search engine service, a content delivery service, a communication or content screening service, a communication or content screening service, and any combination of these.

4. A method as in claim 1, wherein the obtaining at least one objective reputation metric related to a first user contributor reputation comprises the step of collecting the at least one objective reputation metric related to the reputation of the first user contributor.

5. A method as in claim 4, wherein the collecting the at least one objective reputation metric is performed automatically by the method without a separate conscious input by the first user contributor.

6. A method as in claim 1, wherein the obtaining at least one objective reputation metric related to a first user contributor reputation comprises obtaining the at least one objective reputation metric related to a first user contributor reputation from an external source.

7. A method as in claim 1, wherein the identifying of the first communication or content comprises: at least one of: (i) receiving the first communication or content from the first user contributor; and (ii) identifying the first contribution or content attributed at least in part to the first user contributor.

8. A method as in claim 1, wherein the using of the graphical forecasting interface comprises a procedure for gathering information from a user and predicting a future outcome including:

providing a graph having an interactive portion;
receiving user input via the interactive portion of the graph;
sending the user input to a memory device for storage;
retrieving information from the memory device;
manipulating the information thereby generating desired information; and
displaying the desired information on the interactive portion of the graph.

9. A method as in claim 1, further comprising sending a second communication to a user that includes the generated processed communication or content or portion thereof.

10. A method as in claim 1, further comprising: obtaining at least one objective reputation metric related to a plurality of different user contributor reputations; identifying a communication or content having an association with each of the plurality of user contributors; and processing the plurality of communications or contents to generate a processed communication or content based on the obtained objective contributor reputation for the plurality of different user contributors.

11. A method as in claim 1, wherein the processing based on objective reputation comprises a processing selected from the set consisting of filtering, sorting, ordering, screening, compiling, grouping, deleting, flagging, hiding, highlighting, promoting, and any combination of these based on objective reputation of a contributor or a plurality of contributors.

12. A method as in claim 11, wherein the processing may be different for different contributors or for different groups of contributors.

13. A method as in claim 1, wherein the processing based on objective reputation includes a processing selected from a set consisting of: filtering to include some items and not others based on objective reputation of the contributor or group of contributors, filtering based on objective reputation of the contributor or group of contributors, filtering to exclude some items and not others based on objective reputation of the contributor or group of contributors, compiling a set of relevant content based on objective reputation of the contributor or group of contributors, ordering based on objective reputation of the contributor or group of contributors, ordering from low to high based on objective reputation of the contributor or group of contributors, ordering from high to low based on objective reputation of the contributor or group of contributors, selecting or not selecting based on objective reputation of the contributor or group of contributors, processing based on objective reputation of the contributor or group of contributors, generating derivative objective reputation data based on objective reputation of the contributor or group of contributors, and any combination of these.

14. A method as in claim 1, wherein the communication or content service is a communication forum selected from a set of forums consisting of: a network site, an Intranet site, an Internet site, a world wide web site, an electronic mail or email, an interactive electronic bulletin board, an interactive electronic message board, an online information exchange, a set of email or comment threads, an online interactive stock prediction forum, an online forum, and any combination of these.

15. A method as in claim 1, wherein the objective reputation metric comprises a factually based objective contributor reputation established in the same field of endeavor as the contribution being communicated.

16. A method as in claim 1, wherein the objective contributor reputation comprises a historical accuracy-based reputation.

17. A method as in claim 16, wherein the historical accuracy-based reputation is for a contribution in the same field as the reputation was established.

18. A method as in claim 1, wherein the step of collecting the at least one objective reputation metric, comprises collective objective reputation metrics automatically without compelling a user take separate actions to provide objective metrics of information from which the objective reputation metrics are derived.

19. A method as in claim 1, wherein the method further comprising matching these objective reputation metrics closely to the topic of the particular communication forum.

20. A method as in claim 1, further comprising filtering contributor postings with a predetermined objective accuracy and without a conscious human input contribution relative to a filtering metric.

21. A method as in claim 1, wherein the method further includes automatically tracking the accuracy of contributors who provide an online prediction or forecast of an element and generating a prediction accuracy result by comparing the prediction of the element with the actual value of the element at the predicted time and date, and automatically generating a prediction accuracy for the contributor based on that comparison.

22. A method as in claim 21, wherein the element is an online stock price prediction.

23. A method as in claim 1, wherein the at least one objective reputation metric are to be subjected to aging or other refinement so that recent objective history is given a greater objective weight or older performance may be discounted or not considered at all.

24. A method as in claim 1, wherein collected or otherwise directly or indirectly available reputation metrics are processed to make them more useful.

25. A method as in claim 24, wherein the processing to make them more useful comprises applying a statistical processing to a least one objective reputation metric.

26. A method as in claim 25, wherein the applied statistical processing is selected from the set of statistical processing comprising: computing a weighted average over time, normalizing the reputation or plurality of reputations so that one contributor's reputation can be compared with another contributor's reputation according to some defined comparison criteria.

27. A method as in claim 1, wherein the defined comparison criteria comprises an objective comparison criteria.

28. A method as in claim 1, wherein the objective reputations comprise raw reputations, processed reputations, or any combination of raw reputations and processed reputations.

29. A method as in claim 1, wherein the method further includes filtering or automatically selecting contributions to be seen or presented to a user based on an objective metric or combination of a plurality of metrics.

30. A system for providing a reputation processed based on-line communication or content, the system comprising:
a server computer having a processor and a memory coupled to the processor, the server computer coupled with an external network for communicating with other computers including with a first computer different from the server computer, the server computer further comprising:
a contributor reputation metric collection component configured for obtaining at least one objective reputation metric related to a reputation of a first user contributor for making a prediction forecast as to a state or condition of a future event over the external network comprising a plurality of interconnected computers including a first computer having a first processor and a first memory coupled to the first processor;

a communication or content identification component configured for identifying a first communication or content having an association with the first user contributor; and a communication or content reputation processing component configured for processing the first communication or content in the first computer to generate a processed first communication or content based on the obtained at least one objective reputation metric; and wherein:

the contributor reputation metric collection component is further configured to obtain the at least one objective reputation metric using prior inputs by the user contributor through a graphical forecasting interface; and the processing component is further configured to:

obtain a plurality of prior predictions from the first user contributor for at least one particular predicted item state including obtaining at least some of the plurality of predictions using the graphical forecasting interface;

store the obtained predictions in a database coupled with the network;

process the stored predictions and automatically determining an objective prediction accuracy record from the stored first user contributed predictions by comparing the earlier predicted state with the later actual state of the same item corresponding to the prediction date and optionally to the prediction time; and use the detailed objective prediction record for the first user contributor to objectively filter contributor postings made by the contributor including in processing the first communication or content in the first computer to generate the processed first communication or content based on the obtained at least one objective reputation metric, the objective filtering being operative to filter sites, message boards, and/or bulletin board posts or contributions, in advance, based on the reputation of the user contributor.

31. A system as in claim 30, wherein the contributor reputation metric collection component further comprises an automatic contributor reputation metric collection component for collecting at least one reputation metric related to a reputation of a contributor automatically without a separate conscious input by the contributor or receipt of such separate conscious contributor input by the system.

32. A system as in claim 31, wherein the at least one reputation metric is obtained from an external source.

33. A system as in claim 30, wherein the contributor reputation metric identification component includes means for identifying of the communication or content selected from a set consisting of: (i) receiving a first communication or content from the first contributor; and (ii) identifying a contribution or content attributed at least in part to the first contributor.

34. A system as in claim 33, wherein the communication or content reputation processing component comprises a processing unit adapted for processing selected from a set of processing schemes consisting of filtering, sorting, ordering, screening, compiling, grouping, deleting, flagging, hiding, highlighting, promoting, and any combination of these based on objective reputation of a contributor or a plurality of contributors.

35. A system as in claim 34, wherein the processing may be different for different contributors or for different groups of contributors.

36. A system as in claim 35, wherein the communication or content reputation processing component comprises a processing unit adapted for processing selected from a set of processing schemes consisting of filtering, sorting, ordering, screening, compiling, grouping, deleting, flagging, hiding, highlighting, promoting, and any combination of these based on objective reputation of a contributor or a plurality of contributors.

37. A system as in claim 30, wherein the communication or content medium component is selected from a set consisting of a network site, an Intranet site, an Internet site, a world wide web site, an electronic mail or email, an interactive electronic bulletin board, an interactive electronic message board, an online information exchange, a set of email or comment threads, an online interactive stock prediction forum, an online forum, and any combination of these.

38. A system as in claim 30, wherein the communication or content medium component further includes (a) means for entering information, and (b) means for displaying information.

39. A system as in claim 30, wherein the communication or content filtering component provides means for sorting, limiting, compiling, or otherwise modifying the display of information that has been entered based on metrics that have been collected.

40. A communication or content processed according to the method of claim 1.

41. A computer program product stored in a tangible electronically accessible media for altering the operation of a computer system or computer network, the computer program product including executable computer program instructions for causing the computer to generate a processed reputation-based communication or content and comprising instructions for:

obtaining at least one objective reputation metric related to a reputation of a first user contributor over a network comprising a plurality of interconnected computers including a first computer having a first processor and a first memory coupled to the first processor;

identifying a first communication or content having an association with the first user contributor; and processing the first communication or content in the first computer to generate a processed first communication or content based on the obtained at least one objective reputation metric.

42. A business method for operating a reputation-based communication or content provision service, the business method comprising:

obtaining at least one objective reputation metric related to a reputation of a first user contributor for making a prediction forecast as to a state or condition of a future event over a network comprising a plurality of interconnected computers including a first computer having a first processor and a first memory coupled to the first processor;

identifying a first communication or content having an association with the first user contributor;

processing the first communication or content in the first computer to generate a processed first communication or content based on the obtained at least one objective reputation metric;

providing the processed first communication or content to a subscriber; and receiving a remuneration from the subscriber in exchange for the provided processed first communication or content;

wherein the obtaining of the at least one objective reputation metric is performed using prior inputs by the user contributor through a graphical forecasting interface; and the processing further includes:
obtaining a plurality of prior predictions from the first user contributor for at least one particular predicted item state including obtaining at least some of the plurality of predictions using the graphical forecasting interface;
storing the obtained predictions in a database coupled with the network;
processing the stored predictions and automatically determining an objective prediction accuracy record from the stored first user contributed predictions by comparing the earlier predicted state with the later actual state of the same item corresponding to the prediction date and optionally to the prediction time; and
using the detailed objective prediction record for the first user contributor to objectively filter contributor postings made by the contributor including in processing the first communication or content in the first computer to generate the processed first communication or content based on the obtained at least one objective reputation metric, the objective filtering being operative to filter sites, message boards, and/or bulletin board posts or contributions, in advance, based on the reputation of the user contributor.

43. A business method as in claim 42, wherein the remuneration is a financial remuneration, a service remuneration, a commission remuneration, a referral remuneration, or any combination of these.

44. A method as in claim 1, wherein the obtaining of a plurality of predictions from the first user contributor for at least one particular predicted item state is performed automatically without a separate conscious input by the first user contributor.

45. A method as in claim 1, wherein the objectively filtering comprises filtering using an objective historical accuracy based metric that includes a percentage of accurate historical prediction of the same item or of the same class of items.

46. A method as in claim 1, wherein the user contributor reputation is a reputation that is particular to an identified item or class of items.

47. A method as in claim 46, wherein the reputation is particular to a particular identified stock or security item and not to all stocks or security items or to non-stocks or non-security items.

48. A method as in claim 47, wherein the number of predictions comprises thousands of predictions that are obtained and stored in the database with a minimal drain on a user contributor time.

49. A method as in claim 48, wherein the graphical forecasting interface comprises and interface wherein the user contributor identifies a prediction for a stock or security by mouse-clicking on one of an up-arrow to indicate a prediction that the value or the stock or security will increase and a down-arrow to indicate a prediction that the value or the stock or security will decrease.

50. A method as recited in claim 8, wherein the step of receiving user input further comprises the steps of: analyzing a line drawn by the user, a user mouse click, a user touch-screen or touch pad or pen input, or another user input graphical interaction using a pointing device, key stroke, voice input, or other interaction on or relative to the interactive portion of the graph to determine the user input.

51. A method as recited in claim 8, wherein the objective reputation metric for the reputation of the user contributor of the prediction forecast as to a state or condition of a future event includes an objective reputation metric for a different event where the different event in the same category of event.

52. A method as recited in claim 51, wherein the forecast as to a state or condition of a future event is a forecast as to a state or condition of a future stock price and the related event is a state or condition of a future stock price for a different stock.

53. A method as recited in claim 1, wherein the graphical interface facilitates selection of predictions based on graphical selection of at least two points on a graph and interpolation of values between the two selected points.

54. A method as recited in claim 53, wherein the graphical user interface receives a clicking on a graph to generate a prediction line and prediction line drawn by the user results in generation of data to a database for storage; and interpolation and/or extrapolation algorithms are used to generate a large number of forecasts from a relatively small number of direct graphical inputs from the user.

55. A system as in claim 30, wherein the graphical forecasting interface includes:
   a graph module having an interactive portion capable of plotting future data points provided by a user;
   a submission module capable of sending the future data points provided by the user to a database for storage;
   a retrieval module capable of retrieving future data points from the database;
   a calculation module capable of performing a desired function on the retrieved future data points to generate a desired result; and
   a display module capable of displaying the desired result as at least one plot on the interactive portion of the graph module.

* * * * *

UNITED STATES PATENT AND TRADEMARK OFFICE
CERTIFICATE OF CORRECTION

| | | |
|---|---|---|
| PATENT NO. | : 7,991,728 B2 | Page 1 of 1 |
| APPLICATION NO. | : 12/898619 | |
| DATED | : August 2, 2011 | |
| INVENTOR(S) | : Kaplan | |

It is certified that error appears in the above-identified patent and that said Letters Patent is hereby corrected as shown below:

On the Title Page, section (73) Assignee:

(73)  Assignee: "PredictWallStreet, Inc., Capitola, CA (US)"
should read -- PredictWallStreet, LLC. Capitola, CA (US) --

Signed and Sealed this

Fourth Day of October, 2011

David J. Kappos
*Director of the United States Patent and Trademark Office*